United States Patent [19]

Baguelin

[11] 3,941,113
[45] Mar. 2, 1976

[54] MULTICYLINDER HEAT ENGINES

[75] Inventor: Yves Baguelin, Louveciennes, France

[73] Assignee: Societe Anonyme de Vehicules Industriels et d'Equipement Mecaniques Saviem, Suresnes, France

[22] Filed: Nov. 11, 1974

[21] Appl. No.: 522,532

[30] Foreign Application Priority Data
Nov. 28, 1973 France .............................. 73.42412

[52] U.S. Cl. ...... 123/179 R; 123/179 E; 123/179 H; 123/180 EH; 123/119 A; 123/198 F; 60/278
[51] Int. Cl.² .......................................... F02N 17/00
[58] Field of Search ........ 123/179 E, 179 R, 179 H, 123/179 L, 180 EH, 97 B, 59 EC, 119 A, 198 F, 139 ST; 60/278, 698–700

[56] References Cited
UNITED STATES PATENTS

| 1,332,803 | 3/1920 | Chorlton | 123/119 A |
|---|---|---|---|
| 2,126,483 | 8/1938 | L'Orange | 123/27 |
| 3,756,205 | 9/1973 | Frost | 123/198 F |
| 3,776,207 | 12/1973 | Simko | 123/119 A |
| 3,779,013 | 12/1973 | Faber et al. | 123/119 A |
| 3,785,355 | 1/1974 | Toepel | 123/119 A |
| 3,800,772 | 4/1974 | Gospodar | 123/198 F |
| 3,805,752 | 4/1974 | Cataldo | 123/119 A |
| 3,842,814 | 10/1974 | Beir | 123/119 A |

FOREIGN PATENTS OR APPLICATIONS

| 941,532 | 11/1963 | United Kingdom | 123/119 A |

Primary Examiner—Charles J. Myhre
Assistant Examiner—James D. Liles
Attorney, Agent, or Firm—Bucknam and Archer

[57] ABSTRACT

A heat engine comprises at least one recycling cylinder having a relatively high compression ratio, at least one motive cylinder having a relatively low compression ratio and means for passing exhaust gases from said at least one motive cylinder to said at least one recycling cylinder, said at least one recycling cylinder providing motive power only during starting operation of the engine.

8 Claims, 5 Drawing Figures

MULTICYLINDER HEAT ENGINES

The present invention relates to multicylinder heat engines.

An object of the invention is to reduce pollution produced by multicylinder heat engines.

It is known that heat engines generate a substantial amount of pollution during starting operation because of misfiring caused by inadequate control of the enrichment and by unsatisfactory combustion of the heavy fraction of the fuel especially when the ambient temperature is low. Thus it is desirable that heat engines especially diesel engines should have a high compression ratio. However, a high compression ratio runs counter to the reduction in the combustion pressures and also does not serve to reduce emissions of nitrogen oxides.

It is known, on the one hand, that the generation of nitrogen oxides is reduced if a low compression ratio is adopted. However, a low compression ratio is disadvantageous in particular for starting a diesel engine, but the effects of a low compression ratio during starting operation may be overcome by an increase in the intake temperature. It is equally known that the recycling of 15 percent of the exhaust gases reduces the nitrogen oxides emitted by 50 percent, provided that the exhaust gases are fed in again whilst cold. A difficulty is encountered in recycling exhaust gases which difficulty consists in devising an external radiator circuit remaining efficient over long periods despite deposits of soot and other combustion products.

In accordance with the present invention a multicylinder heat engine comprises at least one recycling cylinder having a high compression ratio wherein the exhaust gases of the other cylinders are transferred in the opposed direction, the recycling cylinder generating a motive action during the starting operation only.

In operation of the engine of the invention, unburnt hydrocarbons are recovered from the exhaust gases thereby assisting starting operation, a fraction of the exhaust gases, after cooling, are recycled, and the production of nitrogen oxides is reduced because of the relatively low compression ratio of the motive cylinder or cylinders.

The invention is further described below by way of example with reference to the accompanying drawings, wherein.

Figure 1:
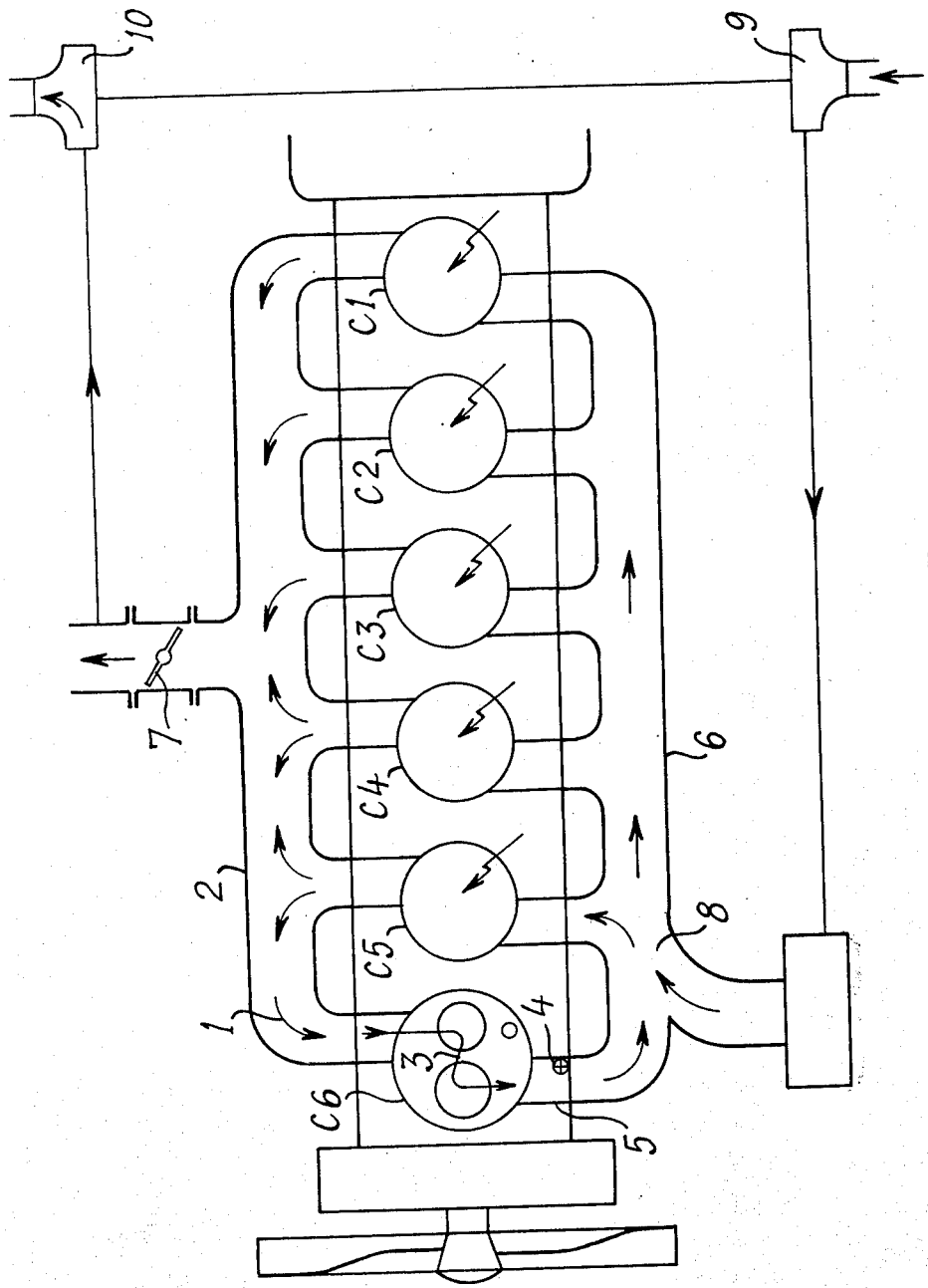
FIG. 1 is a diagrammatic plan view of a multicylinder diesel engine according to the invention.

Referring to FIG. 1, a diesel engine comprises six cylinders $C_1$ to $C_6$. The cylinder $C_6$ is a recycling cylinder. The cylinders $C_1$ to $C_5$ are normally operating motive cylinders. The cylinders $C_1$ to $C_6$ are connected to a common exhaust manifold 2 and to a common inlet manifold 6. Exhaust gases 1 discharged from the cylinder $C_1$ to $C_5$ are ducted into the exhaust manifold 2 and recycled into the cylinder $C_6$ in the opposite direction as shown by arrow 3.

The transfer in the opposite direction into the cylinder $C_6$ is obtained by means of a different setting of the exhaust and inlet cams as compared to the other cylinders $C_1$ to $C_5$.

Figure 4:
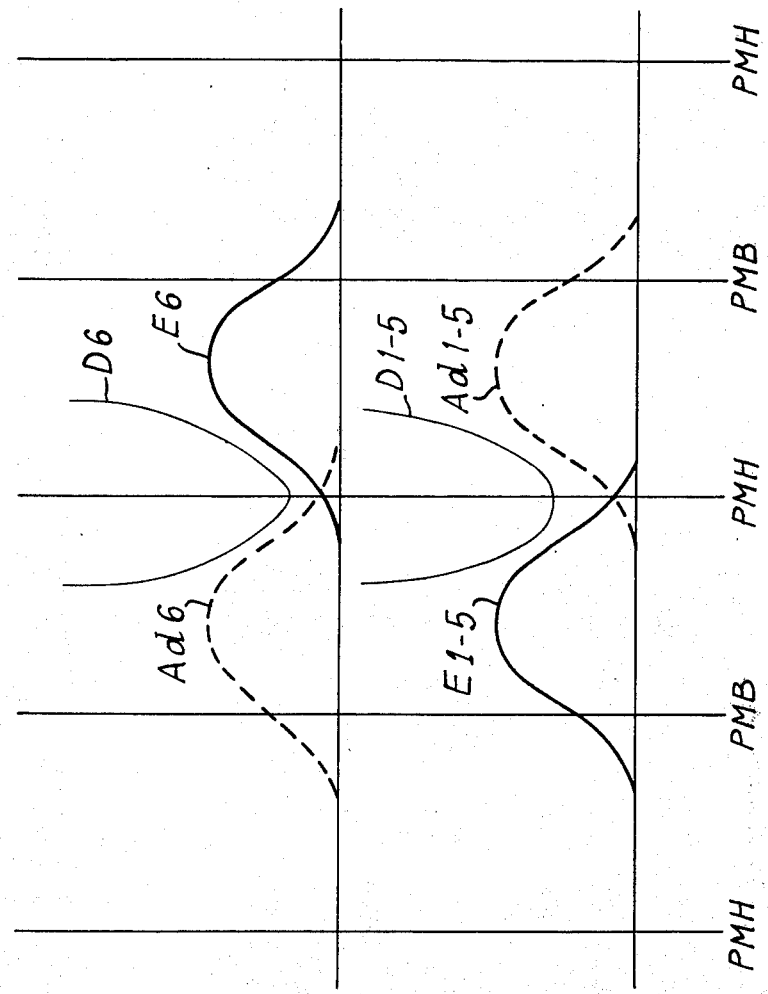
FIG. 4 is a diagram illustrating graphs in respect of communication between the cylinders and the inlet and exhaust manifolds.

To exemplify the timing system, the stroke of the piston of the cylinder $C_6$ is shown by the line $D_6$ in FIG. 4, and the strokes of the pistons $C_1$ to $C_5$ are shown by the line $D_{1-5}$. The continuous line $E_6$ shows the intercommunication between the cylinder $C_6$ and the exhaust manifold 2, and the broken line $Ad_6$ shows the intercommunication of the cylinder $C_6$ with the outlet of the inlet manifold. The continuous line $E_{1-5}$ shows the intercommunication between the cylinders $C_{1-5}$ and the exhaust manifold 2 and the broken line $Ad_{1-5}$ the intercommunication between the cylinders $C_{1-5}$ and the inlet manifold 6.

If the engine shown in FIG. 1 were a conventional diesel engine it would have a compression ratio X. However, the cylinder $C_6$ has a compression ratio $X_6 > X$ and the other cylinders $C_{1-5}$ have a compression ratio $X_n < X$. For example, if X is 17, $X_6$ may be 20 and $X_n$ may be 15.

No fuel is supplied to the cylinder 6 apart from the unburnt fuel in the exhaust gases discharged from the cylinders $C_{1-5}$ and supplied to the cylinder $C_6$.

The engine shown in FIG. 1 will normally not comprise an injector device associated with the recycling cylinder $C_6$. However, an injector 4 may be incorporated at the level of a recycling outflow passage 5 connected to the intake manifold 6 feeding the cylinders $C_1$ to $C_5$. This arrangement of the injector 4 renders it possible to perform the fumigation of the intake flow by injection, preferably in counterflow, into the flow of gas recycled at appropriate temperature.

The fumigation flow may easily be adjusted in the case of the in-line injection pump, by correctly establishing the geometrical features of the pump piston. As a modification the recycling cylinder $C_6$ may retain its injector, like the motive cylinders $C_1$ to $C_5$.

Figure 5:
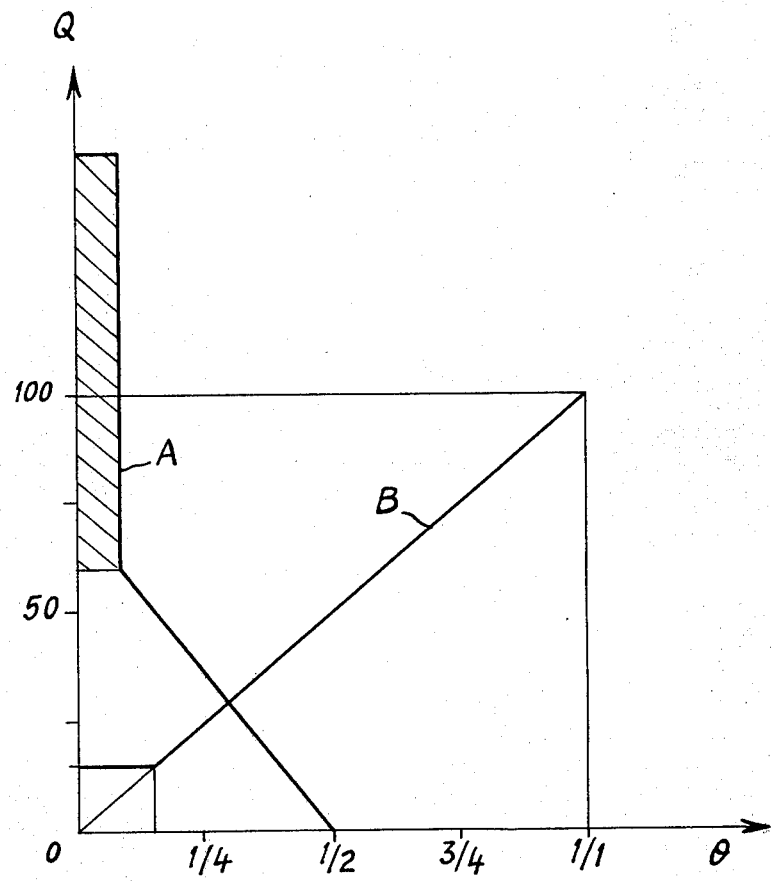
FIG. 5 is a diagram illustrating graphs in respect of the charge of the cylinders as a function of the load.

FIG. 5 shows a graph in which the charge $\theta$ is plotted on the abscissa and the injected flow Q is plotted on the ordinate. The line A shows the flow injected into the cylinder $C_6$ as a function of the charge. The curve B shows the flow injected into the cylinders $C_1$ to $C_5$.

As apparent, the flow of the cylinder $C_6$ (line A) varies in inverse proportion to that of the motive cylinders $C_1$ to $C_5$ (line B) to establish the overcharge flow promoting the starting operation (area shown by hatching), and so that its flow is cancelled as soon as one-half charge is exceeded in the other cylinders $C_1$ to $C_5$, for example.

A heat balance is thus obtained by heating the charging induction flow, which restricts the surplus of air and prevents the discharge of unburnt hydrocarbons in the exhaust from the motive cylinders without altering the filling rate under high load, at which the absence of an injection into the recycling cylinder $C_6$ gives rise to the fundamental cooling cycle affecting the oxidized gases recycled whilst being cold to reduce the generation of nitrogen peroxide.

In this case, the recycled fraction does not reduce the filling rate, because it forms the oxidized complement to the charge of motive fluid progressing into the cylinder in replacement of the normal surplus of air which lies at the root of the generation of nitrogen oxides by the presence of too much free oxygen.

A butterfly valve 7 is situated at the outlet from the exhaust manifold in accordance with the known system for increasing the engine-braking action.

Upstream of the points of supply to the normally operating cylinders $C_1$ to $C_5$, the inlet manifold 6 has a node 8 at which the mixing of fresh and of the recycled exhaust gas is performed, with or without fumigation. The engine may be supercharged by means of a compressor 9 driven by a turbine 10 which is itself driven by means of the exhaust gases. The recycling system does not affect the external supercharging circuit, since it is internal to the engine.

In the case of the supercharged diesel engine, the elimination of one motive cylinder which provides a recycling cylinder $C_6$, may be made up in respect of the rated performance figures of the engine by a higher degree of supercharge rendered acceptable by the lower volumetric compression ratio of the power cylinders $C_1$ to $C_5$, the ease of starting being safeguarded by the initial action of the recycling cylinder having a high compression ratio.

The exhaust throttle 7 is closed when starting, so that the cylinder $C_6$ receives the exhaust from the cylinders $C_{1-5}$. The initial misfires exhausted from the cylinders $C_{1-5}$ are rich in light fuel fractions and form an excellent starting charge.

The ignition of this starting charge is assisted by the high compression ratio of the recycling cylinder and by its supercharge into the passage 5.

After the combustion of the initial charge, which represents the sole case of motive operation of the recycling cylinder $C_6$, the starting speed is increased thanks to its impulsion. The combusted initial charge is exhausted into the inlet of the inlet manifold and heats the air intended for the five normal cylinders $C_{1-5}$ thereby ensuring their ignition, that is to say the replacement of the unburnt mixture by burnt gases in the exhaust manifold from which the recycling cylinder continues to draw its supply.

In normal operation, the recycling cylinder $C_6$ recycles, meters and cools a fraction of the exhaust of the 5 motive cylinders $C_{1-5}$.

The quantity of exhaust gases recycled is inversely proportional to the temperature of the exhaust gases. In the case in question:

$$\frac{Q_{recycled}}{Q_{inducted}} = \frac{1}{5} \times \frac{T_{inlet}}{T_{exhst.}} \times \frac{P_{exhst.}}{P_{inlet}}$$

amounting say to 7 to 10 percent for an exhaust temperature T varying from 600° to 300°C at full inlet opening. For a petrol engine, the quantity of the recycled fraction increases in inverse ratio to the induction pressure, and thus to the charge.

The compression ratio of the recycling cylinder $C_6$ is sufficiently high to obtain a cooling cycle which renders it possible to re-transfer the heat contained in the exhaust gas drawn for recycling, to the water. Calculation shows that the pressure level and the heat level of the cooling cycle come close to those of the engine cycle. The heat balance of the engine and the thermal behavior of the recycling cylinder are accepted without further modifications, in this case.

The result thereof is that, upon emerging from the cylinder $C_6$, the recycled flow has been cooled to a temperature close to the inlet temperature, and may be reduced even more if appropriate, by injecting fuel into the recycled flow from the injector 4.

In the case of the diesel engine, it is apparent that the low compression ratio of the motive cylinders which is rendered possible allows of an improvement in durability and in a reduction in the generation of nitrogen oxides. Moreover, the starting operation is assisted and the wastage of hydrocarbons is reduced. The cooled gases discharged from the cylinder $C_6$, irrespective of the purity of the exhaust, serve as an automatically metered charge of inert gas which restricts the generation of nitrogen oxides without altering the filling rate of the motive cylinders $C_{1-5}$.

The elimination of one motive cylinder in the case of the six cylinder engine may be made up by a high degree of supercharging, more easily acceptable by motive cylinders having a low compression ratio.

The recycling cylinder $C_6$ cannot be taken into account in the calculation of the swept volume of the engine. The cylinder $C_6$ may even be deducted by virtue of its reversed flow.

It should be noted that the mass fraction of recycled gas is approximately equal to:

$$\phi\% = \frac{M_{recycled}}{M_{inducted}} = \frac{n}{N} \times \frac{P_{exhst.}}{P_{inlet}} \times \frac{T_{inlet}}{T_{exhst.}}$$

in which $n$ is the number of recycling cylinders, and $N$ is the number of motive cylinders.

The following values are assumed for a diesel engine, with $n/N = 1/5$ at full charge $\phi = 8$ percent ($T_{exhst.} = 600°C$ at ¼ charge $\phi = 12$ percent It is the action of the decreasing exhaust temperature which increases the mass of recycled gas, which is the richer in oxygen, the smaller the charge. These findings are valid for both natural induction and turbo-supercharged engines.

For an "explosion" engine (premixing of petrol and controlled ignition) $\phi$ becomes:

at full opening $\phi \approx 7$ percent 0.5 atm. vacuum $\phi \approx 15$ percent It is the action of the diminishing induction pressure which increases the mass recycled, consisting of oxidized gas containing little free oxygen, which results in an increase in the weight charge of gas in operation at each cycle, without lowering the $CnHm/O_2$ richness, and a correlative drop of the exhaust temperature for the higher inlet manifold pressure. This may be a factor raising the efficiency at a fractional charge, notwithstanding the improvement in the combustion conditions and the possibilities of heating by mixing.

Figure 2:
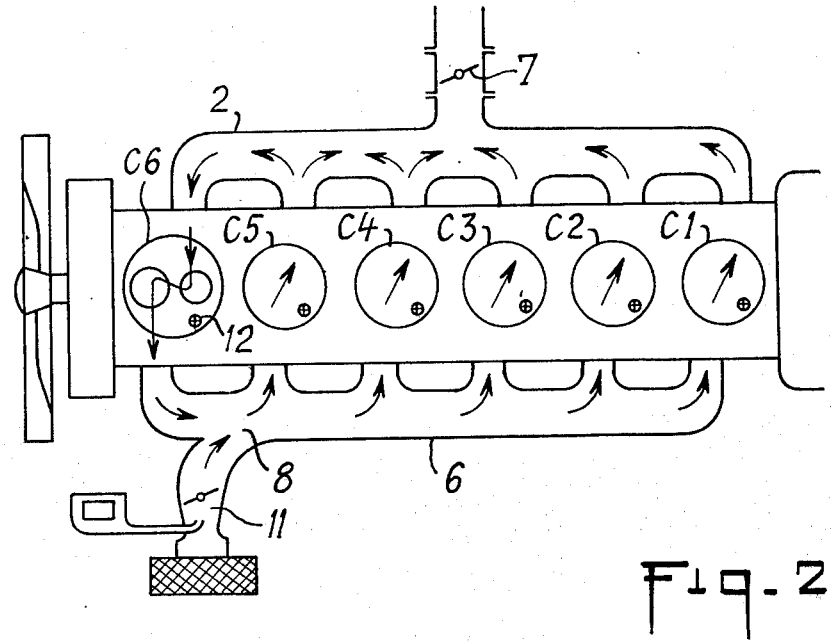
FIG. 2 is a diagrammatic plan view of another engine according to the invention.

FIG. 2 shows an engine making use of controlled ignition and premixing by means of a carburettor 11.

In the engine shown in FIG. 2, the cylinder $C_6$ has a higher compression ratio and the compression ratio of the other cylinders is unmodified. For example, the compression ratio $X_6$ of the cylinder $C_6$ is 10 and the compression ratio $X_n$ of the other cylinders is equal to X which is 7.

Each cylinder $C_{1-6}$ has a respective similarly installed spark plug. The spark plug of the cylinder $C_6$ is indicated by reference numeral 12.

Figure 3:
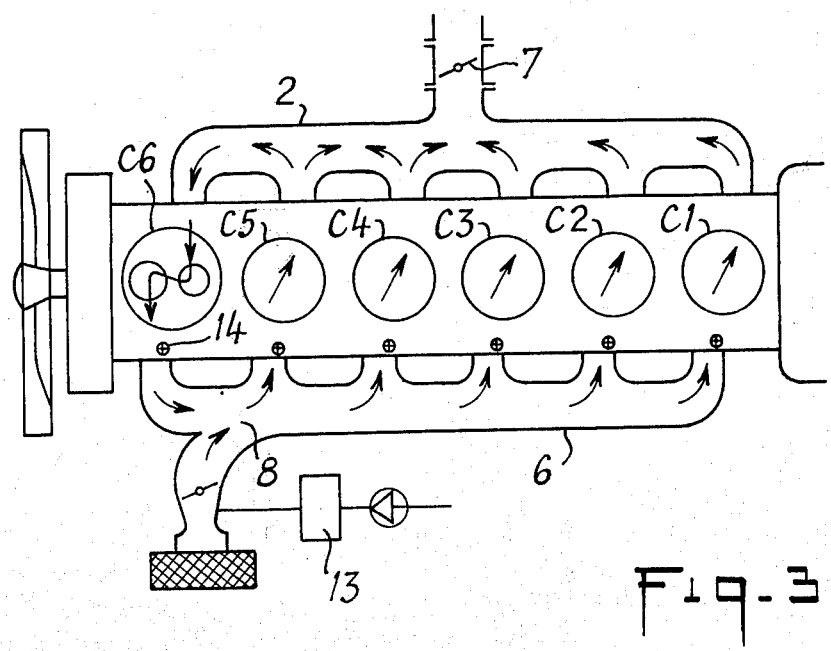
FIG. 3 is a diagrammatic plan view of another engine according to the invention.

FIG. 3 shows an engine making use of indirect petrol injection. The engine comprises an injection assembly 13 like that of a similar, but conventional engine without a recycling cylinder and wherein may be retained the branch associated with the recycling cylinder $C_6$.

An injector 14 is associated with the recycling cylinder $C_6$. The injector 14 injects in counterflow at the side of the inlet duct into the emergent flow, which contributes to the infeed of atomized fuel the emergent flow bears and if possible preheats before it is mixed with the inducted air flow whereof the temperature is raised by being mixed with the recycled oxidized gases.

The compression ratio of the recycling cylinder $C_6$ may be selected in such manner that the outflow temperature of the recycled gas undergoing the cooling cycle is such that a reheating action of adequate magnitude is obtained in the inlet manifold 6.

I claim:

1. A heat engine comprising at least one recycling cylinder having a given compression ratio, at least one motive cylinder having a compression ratio less than that of said recycling cylinder and means for passing exhaust gases from said motive cylinder to said recycling cylinder, said recycling cylinder being operable to provide motive power only during starting operation of the engine.

2. A heat engine according to claim 1, wherein the engine is a diesel engine and the compression ratio of said motive cylinder is optimum for operation when the engine is hot.

3. An engine according to claim 1, wherein the number of motive cylinders is equal to 4 or 5 times the number of recycling cylinders.

4. An engine according to claim 1, wherein an exhaust manifold is connected to said motive cylinder, a region of the exhaust manifold, which in operation of the engine is the coolest region of the exhaust manifold, is connected to said recycling cylinder, and the exhaust manifold is provided with a shut-off member for causing exhaust gas from said motive cylinder to be passed to said recycling cylinder during starting operation of the engine, the shut-off member acting as an exhaust brake during normal operation of the engine.

5. A heat engine according to claim 1, comprising means for passing exhaust gas from said recycling cylinder to said motive cylinder.

6. A heat engine according to claim 5, wherein said exhaust gas passing means comprises an exhaust duct connected to said recycling cylinder, an inlet manifold is connected to said motive cylinder and the exhaust duct opens into the exhaust manifold at its upstream end in such manner as to promote mixing of gas recycled from said recycling cylinder with fresh gas supplied to said inlet manifold.

7. An engine according to claim 1, wherein a fumigation injector is situated in a recycling duct at the outlet of said recycling cylinder.

8. An engine according to claim 7, wherein said fumigation injector has a jet directed towards the recycling cylinder.

* * * * *